United States Patent [19]

Fay et al.

[11] Patent Number: 4,726,985
[45] Date of Patent: Feb. 23, 1988

[54] REFLECTIVE FIBROUS INSULATION

[75] Inventors: Ralph M. Fay, Lakewood; Theodore R. Rohweder, Littleton, both of Colo.

[73] Assignee: Manville Corporation, Denver, Colo.

[21] Appl. No.: 936,874

[22] Filed: Dec. 2, 1986

[51] Int. Cl.$^4$ .......................... B32B 17/02; B32B 27/00; E04B 1/74; E04B 2/00

[52] U.S. Cl. ........................ 428/228; 428/138; 428/251; 428/268; 428/424.2; 428/425.1; 428/428; 428/453; 428/913; 428/920; 52/404; 52/405; 52/406; 52/407

[58] Field of Search ...................... 52/404–407; 428/138, 228, 251, 268, 428, 453, 424.2, 425.1, 913, 920

[56] References Cited

U.S. PATENT DOCUMENTS

| | | | |
|---|---|---|---|
| 2,309,056 | 1/1943 | Finck | 52/407 |
| 4,303,713 | 12/1981 | Clemensen et al. | 428/121 |
| 4,467,005 | 8/1984 | Pusch et al. | 428/111 |
| 4,567,092 | 1/1986 | Catrain et al. | 428/246 |
| 4,600,634 | 7/1986 | Langer | 428/220 |

Primary Examiner—Nancy A. B. Swisher
Assistant Examiner—Patrick J. Ryan
Attorney, Agent, or Firm—John D. Lister; Cornelius P. Quinn; Timothy R. Schulte

[57] ABSTRACT

A laminate of foil and kraft paper is adhered to the upper face of fiber glass insulation so that the exposed foil reflects radiant heat entering the attic through the roof of a building structure. Relatively thick kraft paper supports the very thin layer of foil without causing a fire hazard due to the use of an inorganic adhesive, such as sodium silicate, to bond the two together and also due to the use of a fire retardant water-based adhesive to bond the foil-kraft laminate to the fiber glass. The laminate is preferably perforated to prevent it from functioning as a vapor barrier.

16 Claims, 7 Drawing Figures

U.S. Patent  Feb. 23, 1988  4,726,985
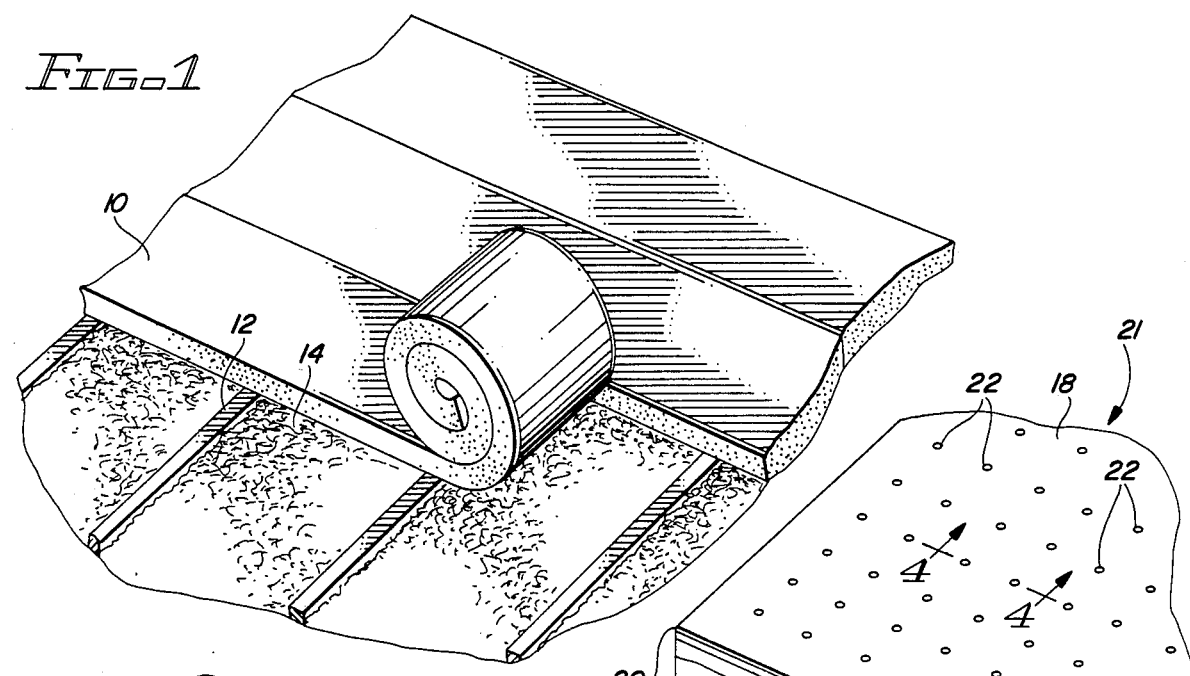
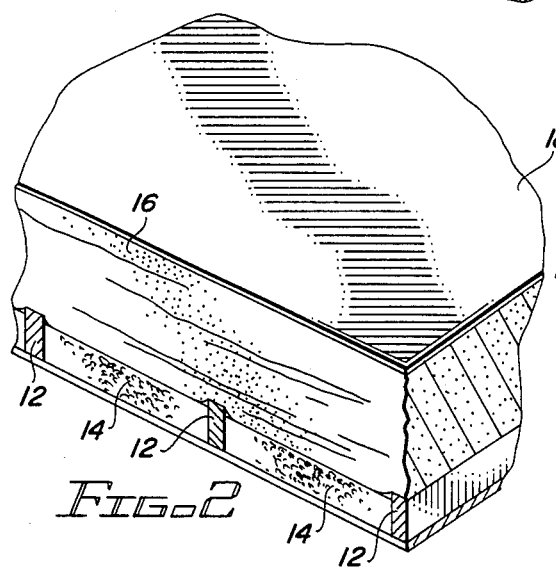
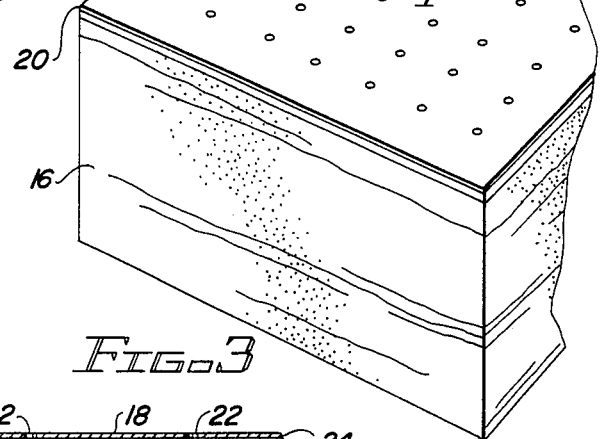
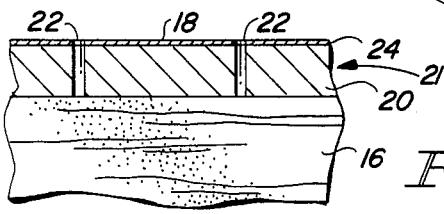
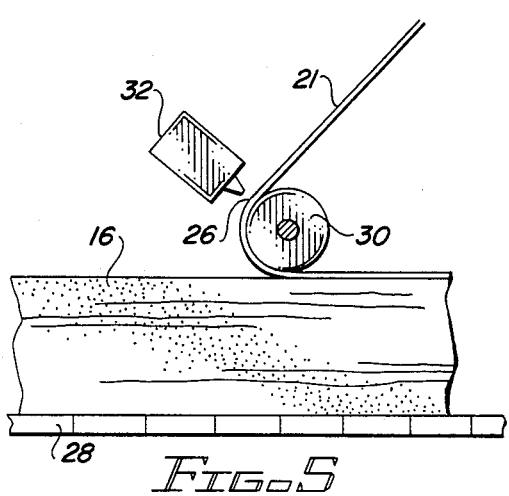
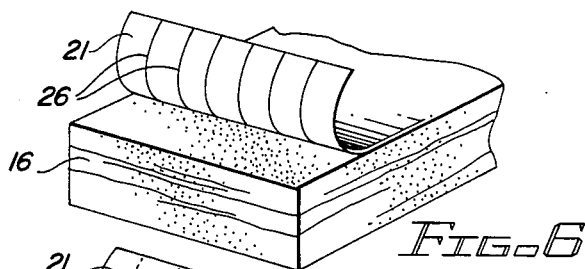
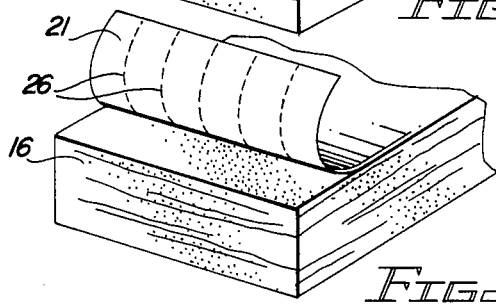

REFLECTIVE FIBROUS INSULATION

FIELD OF THE INVENTION

This invention relates to reflective insulation for use in the attic of a house or other building, and more particularly it relates to the laminated construction of the reflective foil layer and the fibrous insulation.

BACKGROUND OF THE INVENTION

Reflective insulation of the type comprising a laminate of aluminum foil and fiber glass insulation has been used as attic insulation for some time. It is primarily used in areas of low winter temperatures and is conventionally installed over or between the joists with the foil side down so that heat radiating up from the room below will be reflected back, thus reducing heat loss through the ceiling. Typically, laminates of aluminum foil and kraft paper are used instead of plain aluminum foil, with the kraft paper side of the laminate being attached to the fiber glass insulation by an asphaltic hot melt adhesive. The foil surface of such products is applied face down against the gypsum board ceiling, since if the foil surface is left exposed the asphaltic adhesive near the foil surface would crate a potential fire hazard. Such foil-kraft laminates are generally comprised of aluminum foil having a thickness of 0.00025 to 0.00035 inch, laminated to kraft paper weighing 30 to 40 pounds per ream.

In addition, reflective foil barriers are used in attics to reflect the radiant energy of the sun which passes through the roof. Reflective foil barriers are particularly useful in warmer climates where air conditioning is frequently used. By the addition of a reflective foil barrier to the attic, a large portion of the radiant energy from the sun is prevented from entering the house, thereby reducing the need to operate the air conditioner. For a reflective barrier to be effective, it must be installed in a space protected from the natural elements. An air space adjacent to the exposed foil surface is necessary to reflect the radiant energy.

Prior art reflective foil barriers are comprised of thick aluminum foil, metallized plastic films, or thin aluminum foil laminated to a carrier sheet. Such barriers are typically laid over the top surface of existing attic insulation, stapled to the underside of the roof rafters before the roof decking is installed, or laminated to the underside of the roof decking.

In instances where plain aluminum foil is used, no fire hazard is encountered, but the foil must be relatively thick, in the order of 0.01 to 0.04 inch, to give the foil enough toughness to enable it to be applied without tearing and installed without being damaged. Such a product is expensive due to the substantial quantities of foil required. It can also be hazardous to handle due to the extremely sharp edges of the foil.

In instances where foil is laminated to a carrier sheet, such as kraft paper, or where the aluminum is metallized onto a plastic film, a fire hazard is presented due to the flammability of the paper or plastic film component. In cases where the fire hazard has been minimized, the cost of the reflective barrier product becomes quite expensive. In addition, the prior art requires installation of a radiant barrier to be a separate procedure from installation of other insulating materials such as fiber glass.

Prior to this invention, a satisfactory inexpensive solution to fire hazards and ease of installation had not been offered.

BRIEF SUMMARY OF THE INVENTION

This invention provides for a laminate comprised of foil and an organic base sheet to be adhered to a layer of fibrous insulation. The foil is extremely thin, which reduces costs and eliminates the dangerous cutting edge of thicker foil sheets. Unlike the foil-kraft paper laminates used to reflect radiant heat coming up through the ceiling, the laminate is bonded together with an inorganic adhesive and to the fibrous insulation with a water based fire retardant adhesive which allows the construction to yield flame spread/smoke developed ratings of 25/50 or less per the ASTM E-84a tunnel test in both slit and unslit test configurations. In addition, the foil and organic base sheet laminate can be perforated so as not to function as a vapor retarder.

Other features and aspects of the invention, as well as its various benefits, will become more clear in the detailed description of the preferred embodiment which follows:

BRIEF DESCRIPTION OF THE DRAWINGS

FIG. 1 is a pictorial representation of a portion of an attic area in which reflective insulation of the type provided by this invention is being installed;

FIG. 2 is an enlarged view of a portion of the installation of FIG. 1;

FIG. 3 is an enlarged partial pictorial representation of the reflective insulation of the present invention;

FIG. 4 is a greater enlarged view of a portion of the foil laminate, taken on line 4—4 of FIG. 3;

FIG. 5 is a schematic view of the laminate application station near the end of a fiber glass insulation production line;

FIG. 6 is a pictorial representation of an end portion of the reflective insulation of the present invention, with the foil laminate peeled back to show the adhesive between the foil laminate and the fibrous insulation; and FIG. 7 is a view similar to that of FIG. 6, but showing a different adhesive pattern.

DESCRIPTION OF THE INVENTION

Referring to FIG. 1, rolls of fiber glass insulation 10 are shown being laid across the joists 12 in an attic, covering the joists and any insulation 14 which may have previously been placed between the joists. Typically, the builder will have used loose mineral wool as the originally applied insulation in amounts which are often inadequate to respond to temperature demands. To remedy the situation, homeowners often apply additional insulation directly over the joists as shown.

The fiber glass insulation product 10 of the present invention is shown in FIG. 2 to comprise a relatively thick layer of conventional bonded fiber glass material 16, typically having a density in the range of 0.4 to 0.8 pcf and an insulating value in the range of R-11 to R-38, the specific amounts depending upon the temperature extremes expected to be encountered. In addition, the upper surface of the fiber glass insulation is faced with aluminum foil 18. As indicated above, by applying the insulation with the foil side up, radiant heat transferred from the attic into the building in the summer is reflected away from the rooms below, thereby reducing the temperature differential between the top and bottom of the insulation. As can be seen, the roll of insulation completely covers the joists and the space between them when installed across the joists. The same result can be achieved when installing it in the direction of the joists by providing the insulation in widths equal to the on-center spacing between adjacent joists.

As shown in FIG. 3, the foil facing 18 is laminated to an underlying support sheet 20 to form a laminate 21, and the support sheet 20 in turn is adhered to the layer of glass fibers 16. A number of perforations 22 are provided in the laminate 21 in order to allow water vapor to pass through instead of condensing inside the insulation and adversely affecting its insulating ability. In accordance with the invention the aluminum foil is extremely thin, in the order of only 0.00025 to 0.00035 inch. This greatly reduces the cost of the foil. Since the foil is considerably more expensive than the support sheet 20, the cost of the facing laminate is still significantly less costly than thicker foil facings.

Because such a thin layer of foil will not withstand the stresses of application or handling, it is necessary to provide a strong but inexpensive flexible layer to support it. According to the invention, relatively heavy kraft paper, weighing in the range of 16 to 45 pounds per ream and having a thickness in the range of 0.0018 to 0.0042 inch, performs this function very well. Normally, the addition of such large quantities of organic material would be expected to increase the surface burning characteristics of the product to a level unsatisfactory to the major building codes when left exposed. Surprisingly, because of the adhesive bonding system between the foil and the kraft paper and between the laminate 21 and the fiber glass, that is not the case with the present invention.

Referring to FIG. 4, the laminate 21 is illustrated in a larger scale, with the perforations 22 shown to extend through the combined thicknesses of the foil 18 and the paper 20. The perforations need not be restricted to any particular size or number so long as there are enough perforations of adequate size to allow water vapor in the insulation to escape to prevent the laminate from acting as a vapor retarder. In practice, perforations of 0.040 to 0.060 inch in diameter spaced about $\frac{1}{4}$ inch apart have been found to perform satisfactorily.

Still referring to FIG. 4, the foil 18 is bonded to the kraft paper 20 by inorganic adhesive 24 applied at the rate of 1.3 to 2.6 pounds per ream (dry). In practice, sodium silicate, such as Grade 45 from Diamond Shamrock Corporation, which carries entrapped water when dry but releases it when exposed to fire, has been found to work well. Although sodium silicate is preferred, other inorganic adhesives capable of being thinly spread to bond the two layers together can be used.

The kraft paper 20 is also known to be bonded to the blanket or layer of glass fibers by adhesive 26. This adhesive, in order to counter the combustible nature of the kraft paper, should be fire retardant. Preferably, it is a fire retardant water based material such as an ethylene vinyl acetate or polyvinyl acetate which has been made fire retardant by the addition of dry filler or liquid flame suppressant additives. Water based adhesives such as Manville LAWX 235 or Borden Gascobond E8986 have proved to be effective.

As schematically shown in FIG. 5, the laminate 21 may be applied to the fiber glass blanket 16 as the blanket is being moved through the production line by the endless chain conveyor 28. This would occur after the binder holding the fibers in place has been cured and just prior to the removal of the blanket from the production line. Typically, the laminate 21 would be drawn from a supply roll, not shown, and trained about the roll 30 after the applicator 32 coats the kraft paper side of the laminate with adhesive 26. The roll 30 is mounted so that it applies sufficient pressure against the laminate and the upper surface of the fiber glass blanket to result in the laminate being securely bonded to the blanket.

As shown in FIG. 6, which depicts a portion of the laminate 21 being peeled back from the fiber glass blanket to show the underside of the laminate, the adhesive 26 is preferably applied in the form of spaced beads or stripes in order to minimize the amount used of this relatively expensive adhesive. Although the amount of adhesive applied and the spacing of the beads or stripes can vary, the arrangement must be able to securely hold the laminate 21 to the face of the blanket. If desired, the adhesive may be applied in rows of spaced dots or dabs to further reduce the amount of adhesive used, so long as the bonding of the laminate 21 to the fiber glass blanket remains secure. Application rates found to be satisfactory at 0.5 to 2.5 grams per square foot (dry). This is a different approach from the usual practice of employing asphaltic adhesives to bond facing materials to fiber glass blankets for residential use.

It has been found that the reflective insulation product of the present invention, even though it incorporates a large quantity of organic combustible material in the form of the draft paper 20, is able to achieve a 25/50 or less rating in th ASTM E-84a tunnel test. This very important test is the guide against which major building codes judge products to determine their surface burning characteristics. In brief, the test provides for a product sample 2 feet wide and 25 feet long to be positioned in an open ended tunnel 18 inches wide by 12 inches high by 25 feet long. A flame is introduced to one end of the tunnel and an induced draft of air is created. The rate at which the flame spreads along the length of the product and the amount of smoke developed during the burning process determines the rating of the product. The resulting rating of flame spread/smoke developed is referred to as the Surface Buring Characteristics of the product. Such ratings are index numbers which have no units and are relative comparisons to the flame spread performance of red oak flooring in the ASTM E-84 test.

In order to simulate installation conditions, products with exposed facings are generally tested in both slit and unslit configurations. The slit configuration requires the facing to be cut lengthwise in the approximate center of the 18 inch wide sample. Tests in the slit configuration typically provide the highest flame spread/smoke developed ratings since they allow the fire to readily reach both sides of the facing.

Fiber glass products must demonstrate flame spread/smoke developed ratings of 25/50 or less to be considered acceptable for use in exposed applications. All major building codes recognize a 25/50 or less Surface Burning Characteristics rating as acceptable.

It should now be apparent that the laminated reflective insulation product of the present invention is quite inexpensive due to the use of only a minimal amount of foil and a minimal amount of the fire retardant adhesives, but surprisingly, even though large amounts of organic paper are used, the product can still pass the ASTM E-84a test on flame spread and smoke developed. Further, the use of the product foil side up in the attic in areas of high summer temperatures can significantly cut down on the amount of heat entering a house from the roof.

It should now be obvious that although preferred embodiments of the invention have been described, changes to certain specific details of the embodiments can be made without departing from the spirit and scope of the invention as defined in the claims.

What is claimed is:

1. A laminated insulation product adapted for use in the attic of a building, comprising:
   a relatively thick layer of fibrous insulation;
   a relatively thin laminate comprising foil and an organic base sheet, the foil being adhered to the base sheet by an inorganic adhesive, the laminate including perforations such that the laminate does not function as a vapor barrier;
   the organic base sheet being relatively thick compared to the thickness of the foil; and
   the organic base sheet of the laminate being adhered by a fire retardant adhesive to a face of the fibrous layer, the foil side of the laminate comprising an outer surface of the insulation product.

2. A laminated insulation product according to claim 1, wherein the inorganic adhesive adhering the foil to the organic base sheet comprises sodium silicate.

3. A laminated insulation product according to claim 1, wherein the foil comprises aluminum foil having a thickness in the approximate range of 0.00025 inch to 0.00035 inch, and the organic base sheet comprises kraft paper having a thickness in the approximate range of 0.0018 to 0.0042 inch and a weight in the approximate range of 16 to 45 pounds per ream.

4. A laminated insulation product according to claim 1, wherein the fire retardant adhesive adhering the laminate to the fibrous insulation comprises spaced accumulations of a fire retardant water-based adhesive.

5. A laminated insulation product according to claim 4, wherein the fire retardant water-based adhesive comprises a fire retardant ethylene vinyl acetate.

6. A laminated insulation product according to claim 4, wherein the fire retardant water-based adhesive comprises a fire retardant polyvinyl acetate.

7. A laminated insulation product according to claim 4, wherein the fibrous insulation is comprised of fiber glass.

8. A laminated insulation product according to claim 4, wherein the insulation product, in both slit and unslit configurations, is capable of achieving a 25/50 or less rating in the ASTM E-84a tunnel test for flame spread and smoke developed.

9. A laminated insulation product according to claim 8, wherein the fiber glass has a density in the approximate range of 0.4 pcf to 0.8 pcf and an insulating value in the approximate range of R-11 to R-38.

10. In an attic space, a laminated insulation product comprising:
   a relatively thick layer of fibrous insulation having an upper face and a lower face;
   a relatively thin laminate of foil and an organic base sheet, the foil being adhered to the base sheet by inorganic adhesive, said laminate including perforations so as to prevent it from functioning as as a vapor barrier;
   the organic base sheet being relatively thick compared to the thickness of the foil; and
   the organic base sheet of the laminate being adhered to the upper face of the fibrous insulation by a fire retardant water-based adhesive so that the foil side of the laminate comprises the outer surface of the upper face of the fibrous insulation.

11. A laminated insulation product according to claim 10, wherein the inorganic adhesive adhering the foil to the organic base sheet is sodium silicate.

12. A laminated insulation product according to claim 10, wherein the foil comprises aluminum foil having a thickness in the approximate range of 0.00025 inch to 0.00035 inch, and the organic base sheet comprises kraft paper having a thickness in the approximate range of 0.0018 to 0.0042 inch and a weight in the approximate range of 16 to 45 pounds per ream.

13. A laminated insulation product according to claim 10, wherein the fire retardant water-based adhesive adhering the laminate to the fibrous insulation is present in the form of spaced accumulations of adhesive.

14. A laminated insulation product according to claim 10, wherein the fibrous insulation is comprised of fiber glass having a density in the approximate range of 0.4 pcf to 0.8 pcf and an insulating value in the approximate range of R-11 to R-38.

15. A laminated insulation product according to claim 10, wherein the insulation product is capable of achieving ASTM E-84a tunnel test results for flame spread and smoke developed of 25/50 or less.

16. A method of forming a laminated insulation product adapted to be used in the attic of a building, comprising the steps of:
   providing a relatively thin laminate of aluminum foil and kraft paper, the thickness of the foil being in the approximate range of 0.00025 inch to 0.00035 inch and the kraft paper having a thickness in the approximate range of 0.0018 to 0.0042 inch and a weight in the approximate range of 16 to 45 pounds per ream, the foil being adhered to the kraft paper by inorganic adhesive, wherein the relatively thin laminate contains a sufficient number of relatively small perforations such that the relatively thin laminate does not function as a vapor retarder; and
   adhering the relatively thin laminate to a face of a relatively thick layer of fiber glass insulation by means of spaced accumulations of a fire retardant water-based adhesive.

* * * * *